(12) United States Patent
Ly et al.

(10) Patent No.: US 11,082,320 B2
(45) Date of Patent: Aug. 3, 2021

(54) TECHNIQUES FOR RMSI PDCCH TRANSMISSION AND MONITORING

(71) Applicant: QUALCOMM Incorporated, San Diego, CA (US)

(72) Inventors: Hung Dinh Ly, San Diego, CA (US); Tao Luo, San Diego, CA (US); Heechoon Lee, San Diego, CA (US); Muhammad Nazmul Islam, Edison, NJ (US)

(73) Assignee: Qualcomm Incorporated, San Diego, CA (US)

( * ) Notice: Subject to any disclaimer, the term of this patent is extended or adjusted under 35 U.S.C. 154(b) by 94 days.

(21) Appl. No.: 16/168,085

(22) Filed: Oct. 23, 2018

(65) Prior Publication Data
US 2019/0123992 A1    Apr. 25, 2019

Related U.S. Application Data

(60) Provisional application No. 62/577,088, filed on Oct. 25, 2017.

(51) Int. Cl.
| | |
|---|---|
| *H04L 12/26* | (2006.01) |
| *H04W 24/10* | (2009.01) |
| *H04W 48/16* | (2009.01) |
| *H04W 72/04* | (2009.01) |
| *H04W 76/27* | (2018.01) |
| *H04W 48/12* | (2009.01) |

(52) U.S. Cl.
CPC .......... *H04L 43/103* (2013.01); *H04L 43/065* (2013.01); *H04W 24/10* (2013.01); *H04W 48/16* (2013.01); *H04W 72/042* (2013.01); *H04W 76/27* (2018.02); *H04W 48/12* (2013.01)

(58) Field of Classification Search
None
See application file for complete search history.

(56) References Cited

U.S. PATENT DOCUMENTS

2019/0021119 A1*    1/2019  Ng .................... H04W 72/0453

OTHER PUBLICATIONS

3GPP TSG RAN WG1 Meeting AH_#NR3,Nagoya, Japan, Sep. 18-21, 2017, PDCCH search space design, R1-1715813 (Year: 2017).*

(Continued)

*Primary Examiner* — Kouroush Mohebbi
(74) *Attorney, Agent, or Firm* — Patterson & Sheridan, L.L.P

(57) ABSTRACT

Certain aspects of the present disclosure provide techniques and apparats for remaining minimum system information (RMSI) physical downlink control channel (PDCCH) monitoring. A method for wireless communications by a user equipment (UE) is provided. During initial access of a cell, the UE determines a default first periodicity to monitor for at least a first PDCCH scheduling RMSI. After the initial access, the UE determines a second periodicity to monitor at least a second PDCCH scheduling RMSI based on the default first periodicity or based on an indication received in a previous RMSI from the cell. The UE monitors for at least the first PDCCH during initial access at the default first periodicity and monitors for at least the second PDCCH at the second periodicity after the initial access.

25 Claims, 15 Drawing Sheets

(56) References Cited

OTHER PUBLICATIONS

3GPP TSG RAN WG1 Meeting #30 Prague, Czechia, Aug. 21-25, 2017, Remaining minimum system information delivery Discussion and decision,R1-1713556 (Year: 2017).*
CATT: "PDCCH Search Space Design", 3GPP Draft; R1-1715813 PDCCH Search Space Design, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017, XP051339273, Retrieved from the Internet: URL:http://www.3gpp.org/ftp/Meetings_3GPP_SYNC/RAN1/Docs/ [retrieved on Sep. 17, 2017], 10 pages.
International Search Report and Written Opinion—PCT/US2018/057280—ISA/EPO—dated Jan. 18, 2019.
Samsung: "Remaining Minimum System Information Delivery", 3GPP TSG RAN WG1 Meeting #90, R1-1713556, Prague, Czechia, Aug. 21-25, 2017, pp. 1-5.

* cited by examiner

TECHNIQUES FOR RMSI PDCCH TRANSMISSION AND MONITORING

CROSS-REFERENCE TO RELATED APPLICATION & PRIORITY CLAIM

This application claims benefit of and priority to U.S. Provisional Patent Application Ser. No. 62/577,088, filed Oct. 25, 2017, herein incorporated by reference in its entirety as if fully set forth below and for all applicable purposes

FIELD OF THE DISCLOSURE

Aspects of the present disclosure relate to wireless communications, and more particularly, to techniques for remaining minimum system information (RMSI) physical downlink control channel (PDCCH) transmission/monitoring for certain systems, such as new radio (NR) systems.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to techniques for remaining minimum system information (RMSI) physical downlink control channel (PDCCH) monitoring.

Certain aspects of the present disclosure provide a method for wireless communications by a user equipment (UE). The method generally includes, during initial access of a cell, determining a default first periodicity to monitor for at least a first PDCCH scheduling RMSI. After the initial access, the UE determines a second periodicity to monitor at least a second PDCCH scheduling RMSI based on the default first periodicity or based on an indication received in a previous RMSI from the cell. The UE monitors for at least the first PDCCH during initial access at the default first periodicity and monitoring for at least the second PDCCH at the second periodicity after the initial access.

Certain aspects of the present disclosure provide an apparatus for wireless communications. The apparatus generally includes at least one processor coupled with a memory and configured to determine, during initial access of a cell, a default first periodicity to monitor for at least a first PDCCH scheduling RMSI and determine, after the initial access, a second periodicity to monitor at least a second PDCCH scheduling RMSI based on the default first periodicity or based on an indication received in a previous RMSI from the cell. The apparatus generally includes a receiver configured to monitor for at least the first PDCCH during initial access at the default first periodicity and monitor for at least the second PDCCH at the second periodicity after the initial access.

Certain aspects of the present disclosure provide an apparatus for wireless communications. The apparatus generally includes means for determining, during initial access of a cell, a default first periodicity to monitor for at least a first PDCCH scheduling RMSI. The apparatus generally includes means for determining, after the initial access, a second periodicity to monitor at least a second PDCCH scheduling RMSI based on the default first periodicity or based on an indication received in a previous RMSI from the cell. The apparatus generally includes means for monitoring for at least the first PDCCH during initial access at the default first periodicity and monitoring for at least the second PDCCH at the second periodicity after the initial access.

Certain aspects of the present disclosure provide a computer readable medium having computer executable code stored thereon for wireless communications. The computer readable medium generally includes code for determining, during initial access of a cell, a default first periodicity to monitor for at least a first PDCCH scheduling RMSI. The computer readable medium generally includes code for determining, after the initial access, a second periodicity to monitor at least a second PDCCH scheduling RMSI based on the default first periodicity or based on an indication received in a previous RMSI from the cell. The computer readable medium generally includes code for monitoring for at least the first PDCCH during initial access at the default first periodicity and monitoring for at least the second PDCCH at the second periodicity after the initial access.

Certain aspects of the present disclosure also provide a method, apparatus, and computer-readable medium, for wireless communications by a base station that may be considered complementary to the UE operations above (e.g., for sending PDCCH scheduling RMSI during and after initial access at the determined periodicities).

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
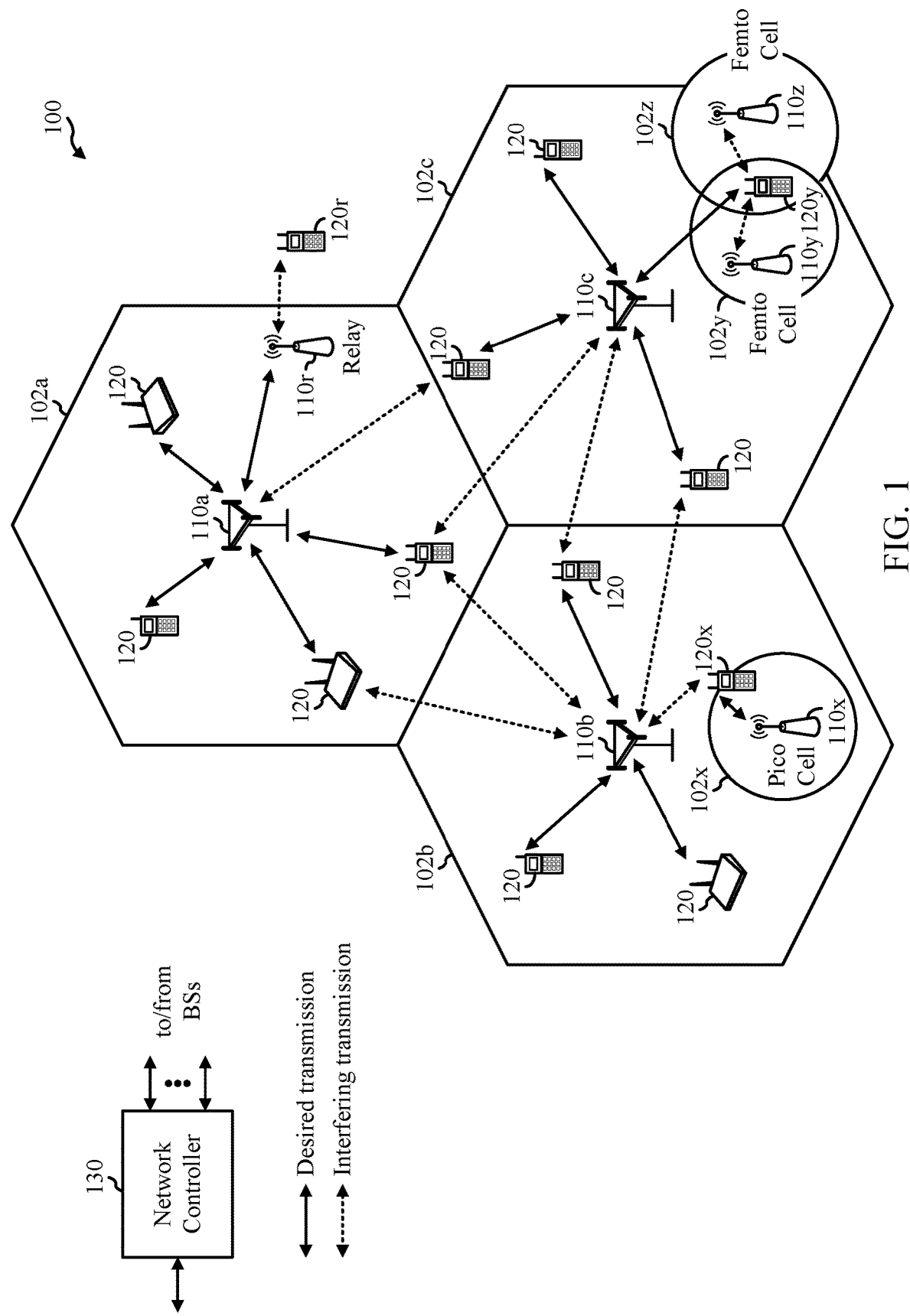
FIG. 1 is a block diagram conceptually illustrating an example telecommunications system, in accordance with certain aspects of the present disclosure.

Aspects of the present disclosure provide apparatus, methods, processing systems, and computer readable mediums for operations that may be performed in NR applications (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g., 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

In certain systems, for initial access to a cell, the UE decodes (e.g., receives and demodulates) the physical broadcast channel (PBCH) to obtain at least some minimum system information. The PBCH can be received in synchronization signal (SS) block (SSB). For example, the SS block may contain a (e.g., one-symbol) primary synchronization signal (PSS), a (e.g., one-symbol) secondary synchronization signal (SSS), and the PBCH (e.g., two symbols). Once the PBCH is decoded, the UE can use the system information for a random access channel (RACH) procedure with the cell.

After receiving minimum system information in the PBCH, the UE may receive remaining minimum system information (RMSI), for example, in a physical downlink shared channel (PDSCH). The RMSI may also be referred to as the system information block (SIB) or Type 1 SIB (SIB1). The RMSI may be scheduled by a physical downlink control channel (PDCCH), for example, in downlink control information (DCI) carried in the PDCCH.

One or more control resource sets (coresets) may be configured for transmission of the PDCCH. The one or more coresets may be associated with one or more SSBs. A coreset may include one or more control resources (e.g., time and frequency resources) configured for conveying the control information. Within each coreset, one or more search spaces (e.g., common search space, UE-specific search space, etc.) may be defined for a given UE. Thus, the UE may monitor within the coreset for the PDCCH scheduling the RMSI. This is sometimes referred to as the PDCCH monitoring window, RMSI PDCCH window, RMSI coreset, etc. The RMSI coreset/PDCCH monitoring window has an offset, a duration (e.g., length), and a periodicity.

The periodicity of the RMSI coreset/PDCCH monitoring window can be flexible (e.g., 10 ms, 20 ms, 40 ms, 80 ms, or 160 ms). If the periodicity of the RMSI coreset/PDCCH monitoring window is signaled in the PBCH payload, the indication may occupy several bits (e.g., 2 or 3 bits). However, the PBCH payload may have a limited number of bits (e.g., 56 bits including cyclic redundancy check (CRS) bits). Thus, it may be desirable for the RMSI coreset/PDCCH monitoring window periodicity to be signaled/determined without signaling the periodicity in the PBCH. Thus, designs for RMSI PDDCH monitoring are desirable, which will allow the UE to determine the periodicity for monitoring the RMSI coreset/PDCCH monitoring window without being indicated the periodicity in the PBCH.

Aspects of the present disclosure provide RMSI PDCCH monitoring techniques that may be used for determining the RMSI coreset/PDDCH monitoring window periodicity, duration, and/or the PDCCH offset within the RMSI coreset/PDCCH monitoring window of a serving and/or one or more neighboring cells. In some examples, the UE assumes a default (e.g., preconfigured or defined in the wireless standards) periodicity during initial access. In some examples, in the radio resource control (RRC) idle or connected states (after performing the initial access with the cell), the UE can receive an indication of the periodicity in signaling received from the cell (e.g., in a received RMSI) or the UE can assume the default periodicity used during the initial access. In some examples, the UE can also receive an indication of the periodicity used by neighboring cells.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless communication network 100 may be a new radio (NR) or 5G network and may utilize remaining minimum system information (RMSI) scheduling/monitoring designs presented herein. User equipment (UEs) 120 may be configured to perform the operations 1000 and other methods described herein and discussed in more detail below. For example, a UE 120 can determine a periodicity to monitor for a physical downlink control channel (PDCCH) scheduling the RMSI based on a default periodicity during initial access. After initial access, the UE can determine the periodicity to monitor PDCCH scheduling RMSI based on the default periodicity or based on an indication received in signaling from the cell (e.g., a received RMSI). A base station (BS) 110 may be configured to perform methods described herein and discussed in more detail below. For example, the BS 110 can determine a periodicity for transmitting the PDCCH scheduling the RMSI and can transmit the PDCCH at the determined periodicity.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
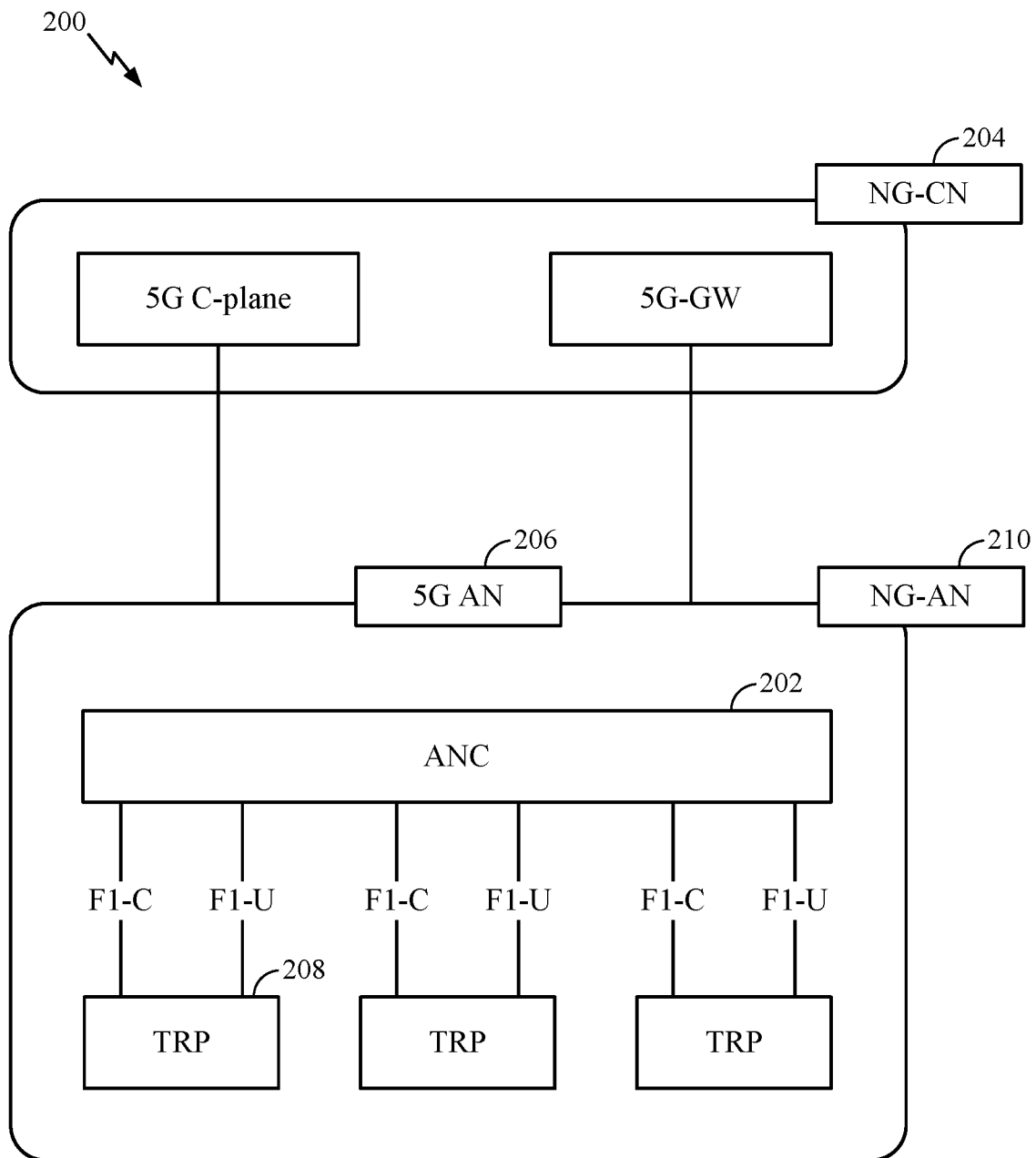
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data. Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
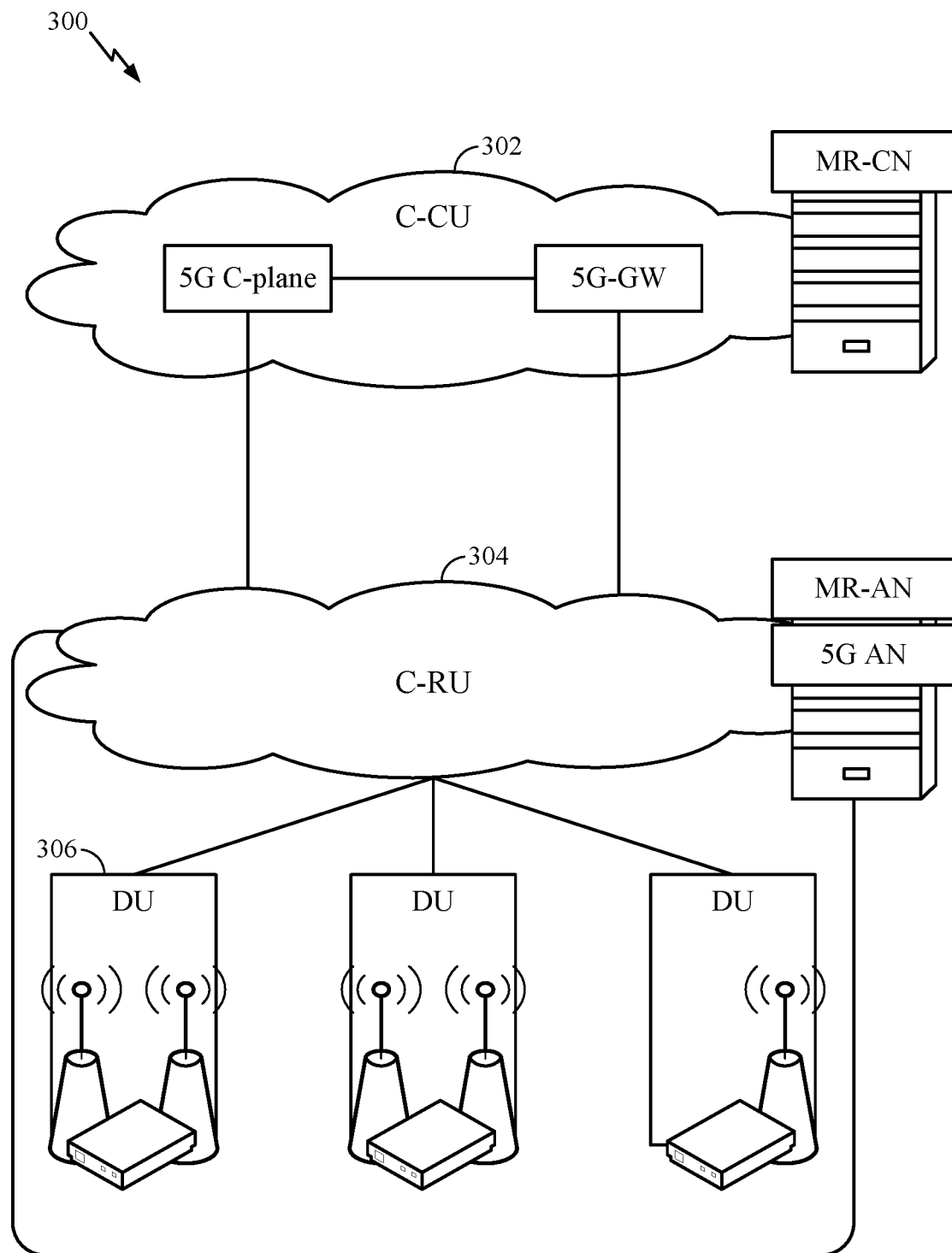
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
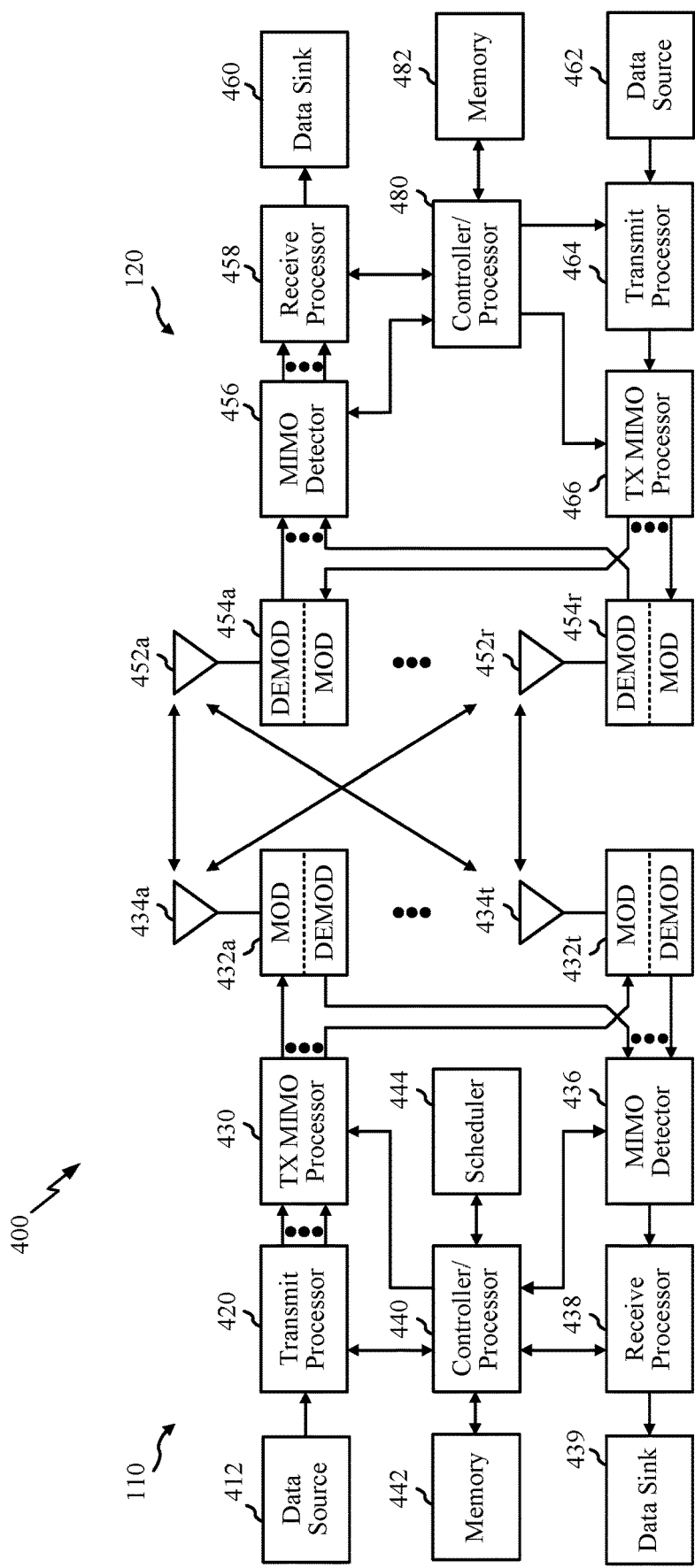
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for RMSI and PDCCH transmission and monitoring.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
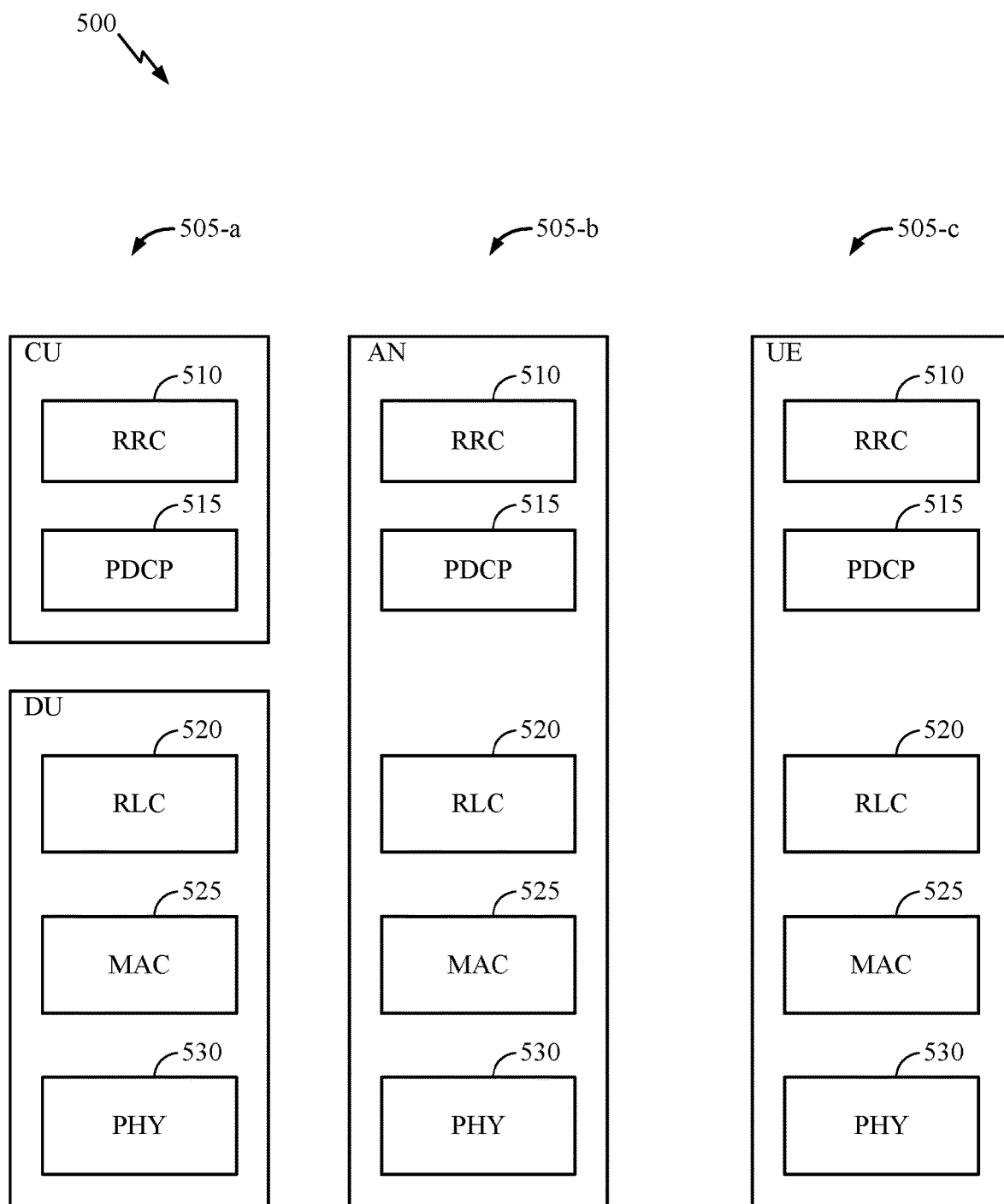
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
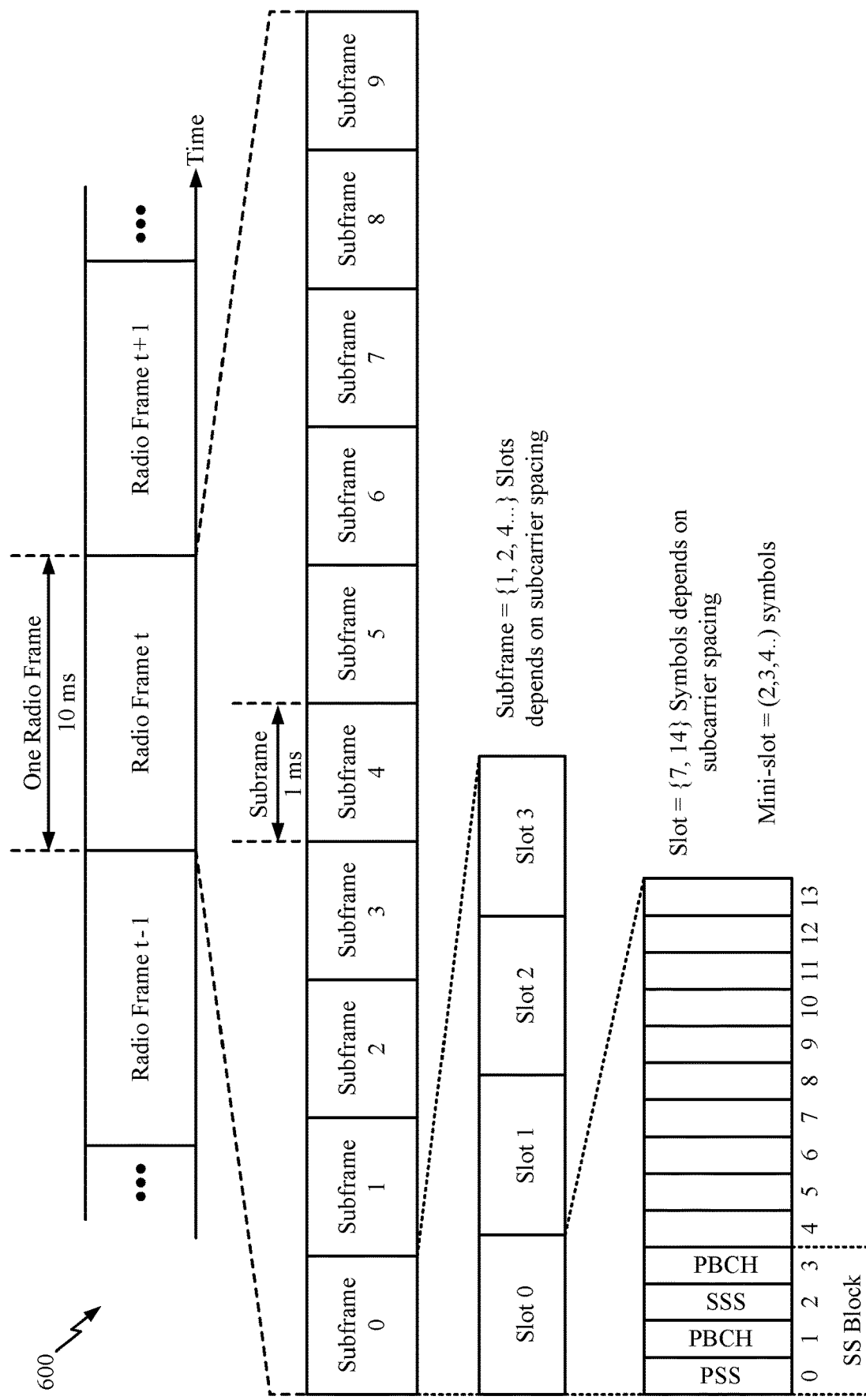
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. For example, one or more of the channels in an SS block may be used for measurements. Such measurements may be used for various purposes such as radio link management (RLM), beam management, etc. A UE may measure the cell quality and report the quality back in the form of a measurement report, which may be used by the base station for beam management and other purposes. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc.

Figure 7:
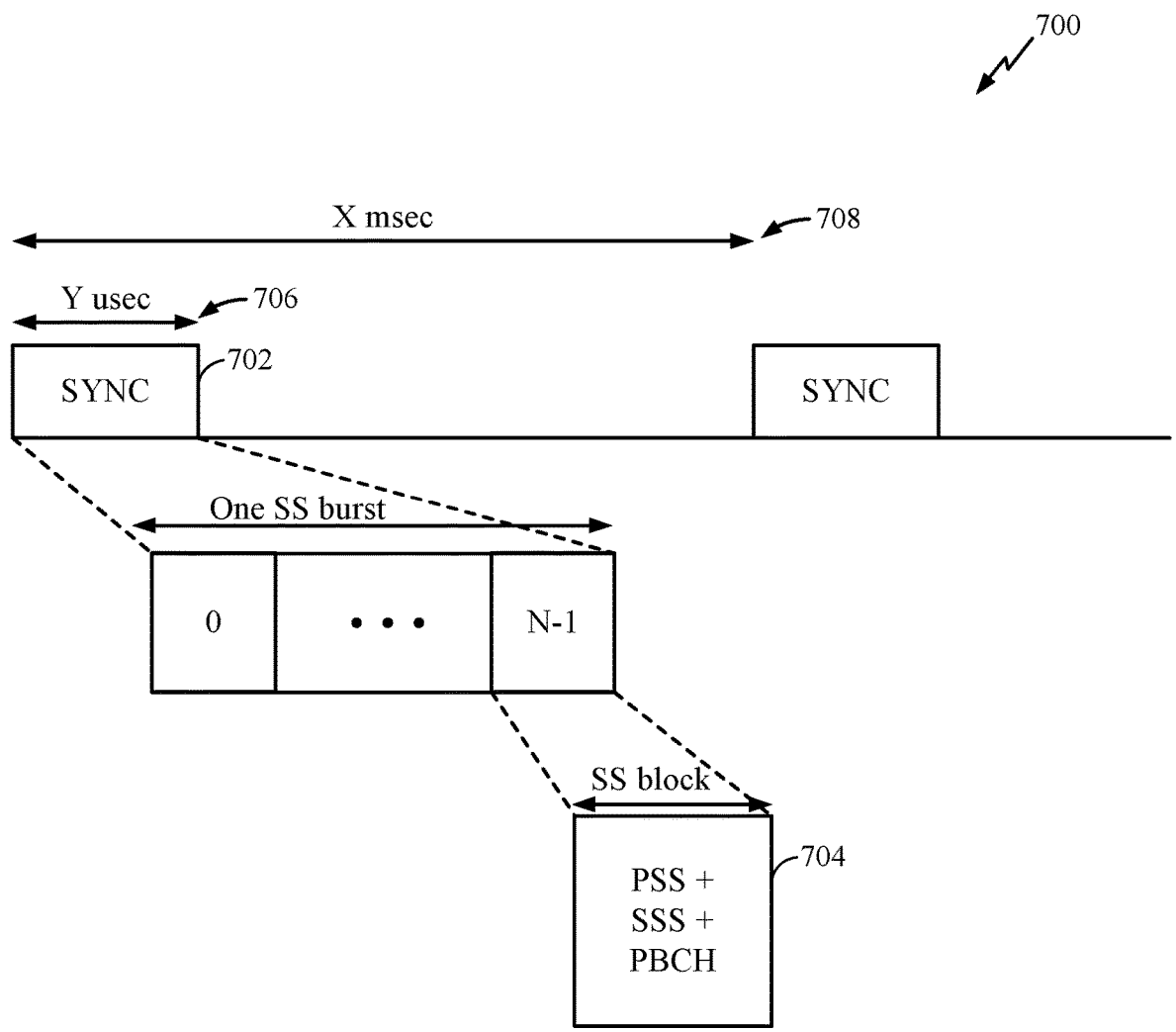
FIG. 7 example transmission timeline of synchronization signals for a new radio telecommunications system, in accordance with aspects of the present disclosure.
Figure 8:
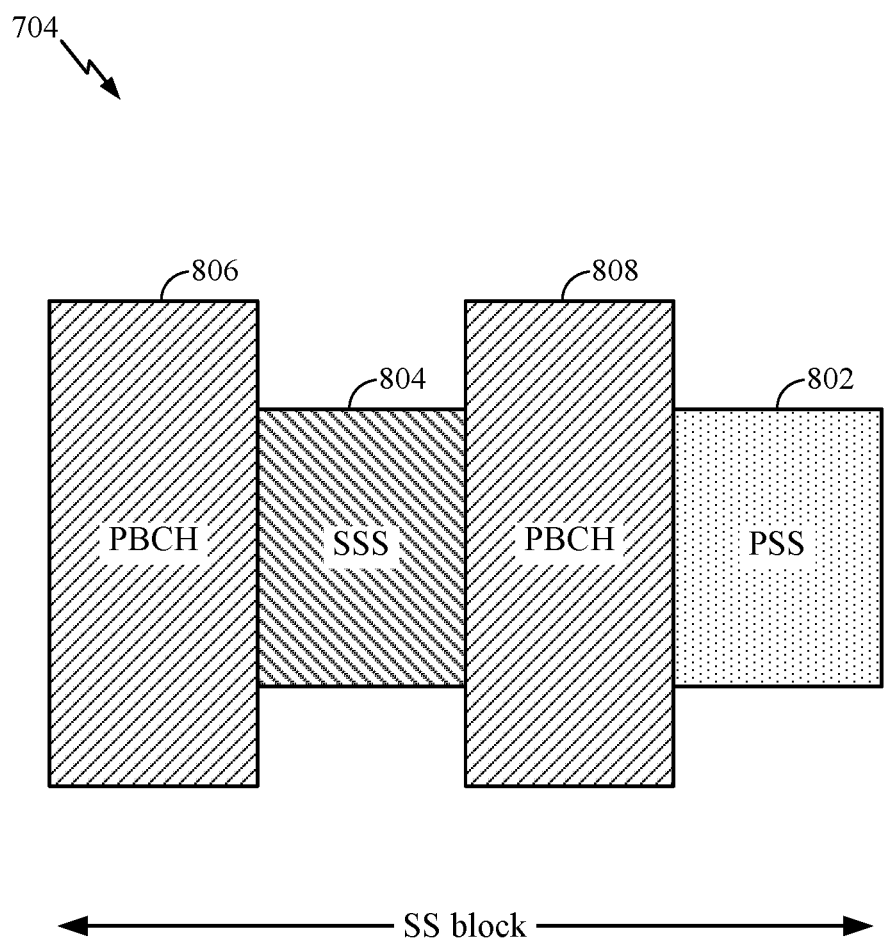
FIG. 8 illustrates an example resource mapping for an exemplary SS block, in accordance with aspects of the present disclosure.

The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations. FIG. 7 illustrates an example transmission timeline 700 of synchronization signals for a new radio telecommunications system, in accordance with aspects of the present disclosure. A BS, such as BS 110 shown in FIG. 1, may transmit an SS burst 702 during a period 706 of Y μsec. As shown in FIG. 7, the SS burst 702 includes N SS blocks 704 with indices of 0 to N-1, and the BS may transmit different SS blocks of the burst using different transmit beams (e.g., for beam-sweeping). Each SS block 704 may include, for example, a PSS, SSS, and one or more PBCH, also referred to as synchronization channels. The BS may transmit SS bursts on a periodic basis, with a period 708 of X ms. For example, as shown in FIG. 8, an SS block 704 may include a PSS 802, an SSS 804, and two PBCHs 806 and 808, although the disclosure is not so limited, and an SS block may include more or fewer synchronization signals and synchronization channels. As shown in FIG. 8, a transmission bandwidth of the PBCHs 806 and 808 may be different from a transmission bandwidth of the synchronization signals, PSS 802 and SSS 804. For example, the transmission bandwidth of the PBCHs 806 and 808 may be 288 tones, while the transmission bandwidth of the PSS 802 and SSS 804 may be 127 tones. Although not shown in FIG. 8, the SS block 902 may also include demodulation reference signals (DMRS) for the PBCH 806 and 808.

As discussed above, after receiving minimum system information (e.g., the master system information block (MSIB)) in the PBCH, the UE may receive remaining minimum system information (RMSI), for example, in a physical downlink shared channel (PDSCH). The PDCCH scheduling the RMSI may be transmitted during an RMSI control resource set (coreset) window (sometimes referred to as an RMSI PDCCH window or PDCCH monitoring window) associated with the SS block. The RMSI coreset window (e.g., transmission/monitoring window) has an offset, a duration (e.g., length), and a periodicity. The periodicity of the RMSI coreset/PDCCH monitoring window can be flexible (e.g., 10 ms, 20 ms, 40 ms, 80 ms, or 160 ms). If the periodicity of the RMSI coreset/PDCCH monitoring window is signaled in the PBCH payload, the indication may occupy several bits (e.g., 2 or 3 bits). However, the PBCH payload may have a limited number of bits (e.g., 56 bits including cyclic redundancy check (CRS) bits). Thus, it may be desirable for the RMSI coreset window periodicity to be signaled/determined without signaling the periodicity in the PBCH.

Example RMSI PDCCH Transmission And Monitoring

Figure 9:
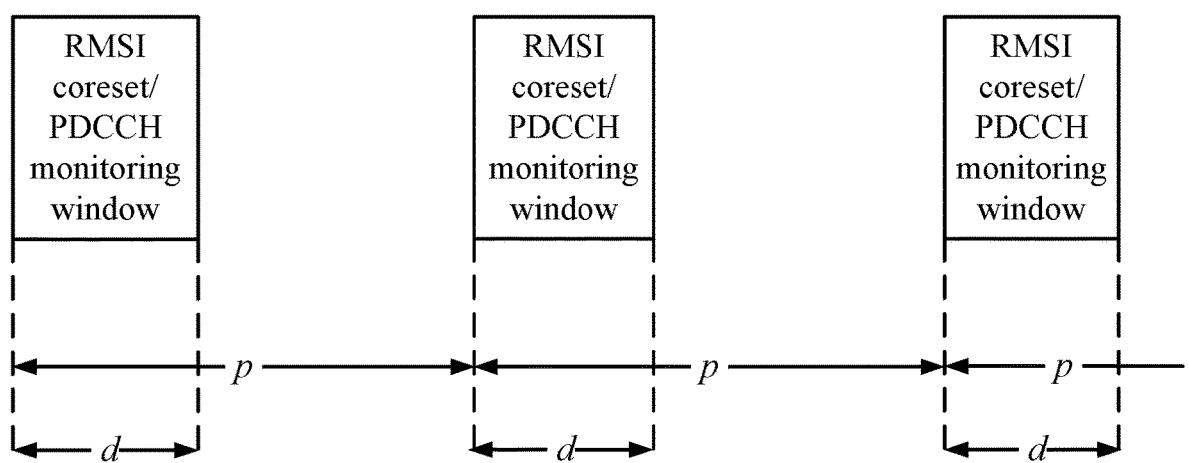
FIG. 9 illustrates example periodic remaining minimum system information (RMSI) control resource set (coreset)/physical downlink control channel (PDCCH) monitoring windows, in accordance with certain aspects of the present disclosure.

FIG. 9 illustrates example periodic remaining minimum system information (RMSI) control resource set (coreset) windows (also referred to as RMSI corset/PDCCH monitoring windows), in accordance with certain aspects of the present disclosure. As shown in FIG. 9, the RMSI coreset/PDCCH monitoring window has a duration d and periodicity p. As described above, the periodicity of the RMSI coreset windows can be flexible. It may be desirable for the RMSI coreset/PDCCH monitoring window periodicity to be signaled/determined without signaling the periodicity in the physical broadcast channel (PBCH), which may have a limited amount of payload bits.

Aspects of the present disclosure provide RMSI PDCCH monitoring techniques that may be used for determining the RMSI coreset/PDCCH monitoring by the UE of the serving cell and/or one or more neighboring cells. Aspects provide techniques for the UE to determine the RMSI coreset/PDCCH monitoring window periodicity—without signaling the periodicity in the PBCH. In some examples, the UE assumes a default (e.g., preconfigured or defined in the wireless standards) periodicity during initial access. In some examples, in the radio resource control (RRC) idle or connected states (after performing the initial access with the cell), the UE can receive an indication of the periodicity in signaling received from the cell (e.g., in a received RMSI) or the UE can assume the default periodicity. In some examples, the UE can also receive an indication of the periodicity used by neighboring cells. Aspects provide for the UE to determine the duration of the RMSI coreset/PDCCH monitoring windows and/or a time offset of PDCCH in the RMSI coreset/PDCCH monitoring windows.

Figure 10:
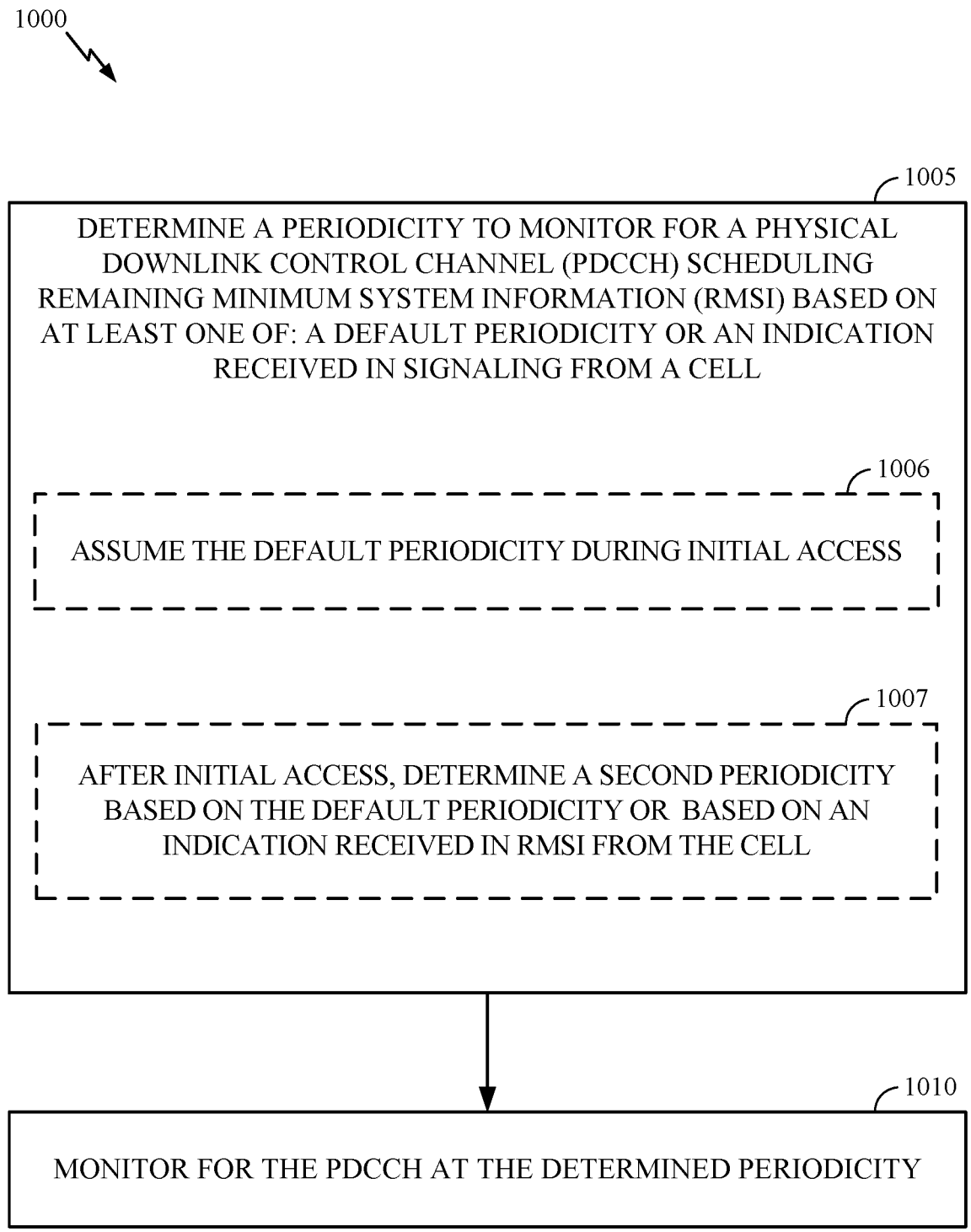
FIG. 10 is a flow diagram illustrating example operations that may be performed by a UE for determining a periodicity to monitor for a PDCCH scheduling RMSI, in accordance with certain aspects of the present disclosure.

FIG. 10 is a flow diagram illustrating example operations 1000 for wireless communications), in accordance with aspects of the present disclosure. Operations 1000 may be performed, for example, by a UE (e.g., a UE 120 in the wireless communication network 100. While not shown, certain aspects of the present disclosure also provide a method for wireless communications by a BS that may be considered complementary to the UE operations 1000 above (e.g., for transmitting PDCCH scheduling RMSI according to a determined periodicity of the RMSI coreset window).

The operations 1000 begin, at 1005, by determining a periodicity to monitor for a PDCCH scheduling RMSI. As shown in FIG. 10, at 1006, the UE determines the default periodicity during initial access of the cell. At 1007, after the initial access, the UE determines a second periodicity based on the default periodicity or based on an indication received in a previous RMSI from the cell.

At 1010, the UE monitors for the PDCCH at the determined periodicity. For example, the UE monitors in an RMSI coreset/PDCCH monitoring window at the default periodicity during initial access and at the second periodicity after initial access. The UE may monitor a physical downlink shared channel (PDSCH) for the RMSI based on the PDCCH (e.g., based on the scheduling information in the PDCCH for the RMSI).

According to certain aspects, the periodicity to monitor for the PDCCH scheduling RMSI may be the same or different from another periodicity for the UE to monitor for a PDCCH scheduling another type of data. In some examples, the periodicity for monitoring the PDCCH scheduling RMSI may be the periodicity of the SSB.

Example RMSI Coreset/PDCCH Monitoring Window Periodicity Determination During Initial Access During initial access (e.g., after power on of the UE, returning from out-of-coverage, etc.) the UE may decode a PBCH to obtain system information. The PBCH may be received in the SSB. The PBCH may contain some minimum system information. The PBCH does not contain any signaling or indication of the periodicity of the RMSI coreset/PDCCH monitoring windows associated with the SSB.

According to certain aspects, as shown in FIG. 10, at 1006, the UE assumes the default periodicity during initial access. For example, the default periodicity may be defined in the wireless standards. The UE may be preconfigured with the default periodicity.

According to certain aspects, the default periodicity may depend on a frequency band. In this case, multiple (e.g., a set of) default periodicities may be defined/preconfigured and the UE may select the default periodicity based on the frequency band. For example, the UE may a first default periodicity if the frequency band is below 6 GHz or a second (e.g., same or different than the first) default periodicity if the frequency band is equal to above 6 GHz.

Example RMSI Coreset/PDCCH Monitoring Window Periodicity Determination After Initial Access After performing the initial access, the UE may be in a radio resource control (RRC) idle state or an RRC connected state. According to certain aspects, in the idle and/or connected state, the network may indicate/signal the RMSI coreset/PDCCH monitoring window periodicity to the UE. In some examples, after the initial access, the UE uses the same default periodicity as used during the initial access. In some examples, if the indication/signaling is not received (e.g., after a duration or threshold, or once the UE wants to monitor for the PDCCH scheduling RMSI), the UE may assume the default periodicity, such as the one assumed for initial access.

As shown in FIG. 10, at 1007, the UE determines the periodicity based on the indication received in signaling from the cell after the initial access or assumes the default periodicity if the indication is not received.

According to certain aspects, the indication of the periodicity may be received via RMSI, other system information (OSI), or radio resource control (RRC) signaling from the cell. In some examples, the UE is configured to follow the periodicity of the SSB as the periodicity of the PDCCH scheduling RMSI. In some examples, the RMSI indicates a periodicity of the SSB. Thus, after initial access, the UE can determine the periodicity based on a received RMSI.

Example Neighbor Cell RMSI Coreset/PDCCH Monitoring Window Periodicity, Duration, and Offset Determination In some cases, the UE may monitor for PDCCH scheduling RMSI in the RMSI coreset/PDCCH monitoring window for a neighbor cell or cells. For example, for cell reselection and/or handover the UE monitors for the neighbor cell RMSI coreset/PDCCH monitoring windows.

According to certain aspects, the UE may receive an indication/signaling from the serving cell (e.g., the serving gNB) of the periodicity of neighboring cell(s) RMSI coreset/PDCCH monitoring window. If the indication/signaling is not received (e.g., after a duration or threshold, or once the UE wants to monitor for the PDCCH scheduling RMSI), the UE may assume the default periodicity, such as the one assumed for initial access.

According to certain aspects, the indication may be received as a single bit indicating whether the periodicity for the neighboring cell RMSI coreset/PDCCH monitoring window is the same or different as the periodicity for the serving cell. The UE indication may be a single bit indicating whether the periodicity for all cells within a frequency layer is the same or different as the periodicity for the serving cell. In some cases, both indications may be received (e.g., an indication for the group of serving cells within a frequency layer and the indication for a particular neighbor cell or cells).

According to certain aspects, the indication of the periodicity may be received via RMSI, OSI, RRC signaling from the cell, and/or a handover command.

As described in more detail below, the indication of the RMSI coreset/PDCCH monitoring window periodicity for the neighbor cell(s) may be provided along with an indication of a time offset of PDCCH(s) in the neighbor cell RMSI coreset/PDCCH monitoring windows and/or an indication of the duration of the neighbor cell RMSI coreset/PDCCH monitoring windows. The UE may determine the periodicity, duration, and/or PDCCH time offsets for the neighbor cell(s) based on the indications. The indications may be provided for one, multiple, or all SS block transmitted by the neighbor cell(s). The indications may be provided via RMSI, OSI, RRC signaling, and/or in a handover command.

Example PDCCH Time Offset within RMSI Coreset/PDCCH Monitoring Windows

Figure 11:
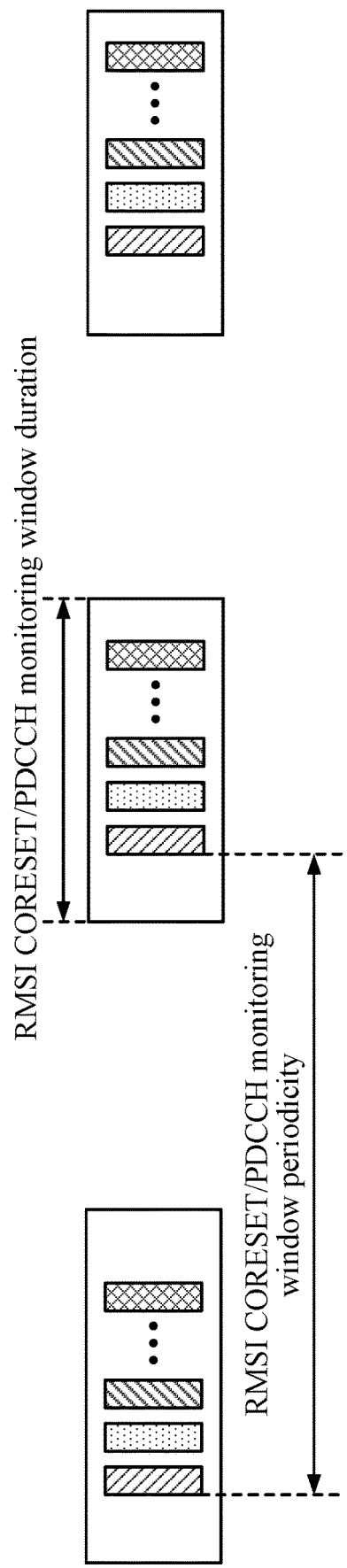
FIG. 11 illustrates example PDCCH location time offset within RMSI coreset/PDCCH monitoring windows, in accordance with certain aspects of the present disclosure.

In some cases, the PDCCH scheduling the RMSI occurs at a time location (or set of locations) offset with respect to the beginning of the RMSI coreset/PDCCH monitoring window. According to certain aspects, the offset (or offsets) may be the same across the RMSI coreset/PDCCH monitoring windows, as shown in FIG. 11. In some cases, the offset(s) may be the same across the RMSI coreset/PDCCH monitoring windows within a modification period, but may change (e.g., be different) from modification period to modification period.

According to certain aspects, the UE may determine the offset of the PDCCH or PDCCHs (e.g., associated with different SS blocks) within the RMSI coreset/PDCCH monitoring windows. For example, the offset may be preconfigured at the UE, defined in the wireless standards, and/or implicitly or explicitly signaled to the UE by the gNB. According to certain aspects, various RMSI coreset/PDCCH monitoring window configurations may be defined. The configurations may define the offsets within the windows. Thus, for implicit signaling, the gNB may signal one of the configurations to the UE, and the UE may determine the offsets based on the configuration. For explicit signaling, the gNB may signal the exact time offset(s) to the UE. The signaling may be via the PBCH, RMSI, OSI, RRC signaling, and/or the handover command. In some examples, the UE may determine a slot index for PDCCH. For example, the UE may determine the slot index of the SSB and the location of the PDCCH may be fixed with respect to the SSB.

During cell reselection and/or handover, the UE may acquire the RMSI PDCCH of one or more neighboring cells. According to certain aspects, the gNB may signal the PDCCH time offset of the neighbor cell RMSI coreset/PDCCH monitoring window to the UE. In some example, the gNB may signal the offset to the UE along with the periodicity indication. In some example, the gNB may signal the offset for the PDCCHs associated with a single, multiple, or all transmitted SS blocks of the neighbor cell. The signaling may be via RMSI, OSI, RRC signaling, and/or in a handover command.

Figure 12:
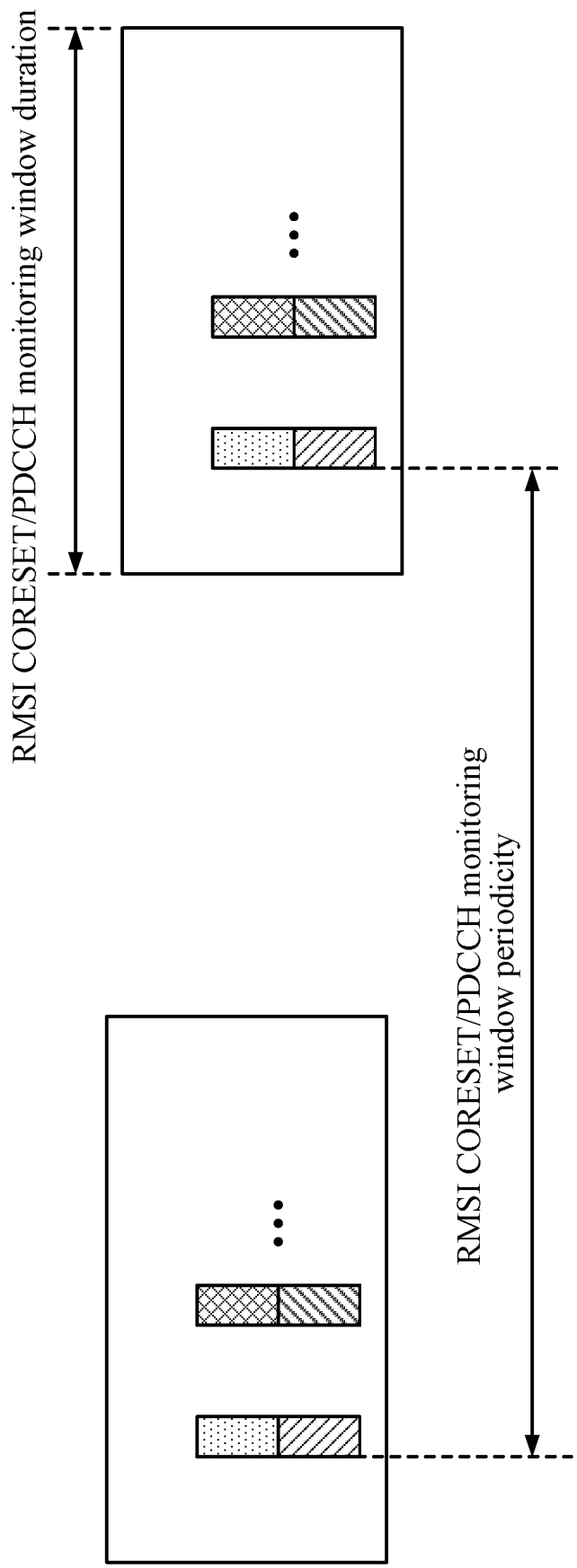
FIG. 12 illustrates example multiple PDCCHs with a same location time offset within an RMSI coreset/PDCCH monitoring window, in accordance with certain aspects of the present disclosure.

According to certain aspects, the RMSI coresets/PDCCHs associated with two SS blocks may share the same time location. In addition, the two PDCCHs may have the same frequency domain search space (not shown) or a different frequency domain search space as shown in FIG. 12. In one illustrative example, assume the gNB transmits four SS blocks and the associated RMSI coreset/PDCCH monitoring window has a periodicity of 80 ms and a duration of 5 ms, thus occurring during 0-5 ms and 80-85 ms, and so on, with respect to the SS block transmissions. The PDCCHs associated with SS block 1 and SS block 2 could arrive in the first monitoring window anywhere in the 0 to 2.5 ms and the SS block 3 and SS block could arrive in the first monitoring window anywhere in the 2.5 to 5 ms.

The offsets may be determined for the PDCCHs associated with all of the SS blocks actually transmitted by the gNB. There may be a maximum number of SS blocks per band (e.g., 4 SS blocks in sub-6 GHz band, 8 SS blocks in 3-6 GHz band, and 64 SS blocks in over-6 GHz band).

Figure 13:
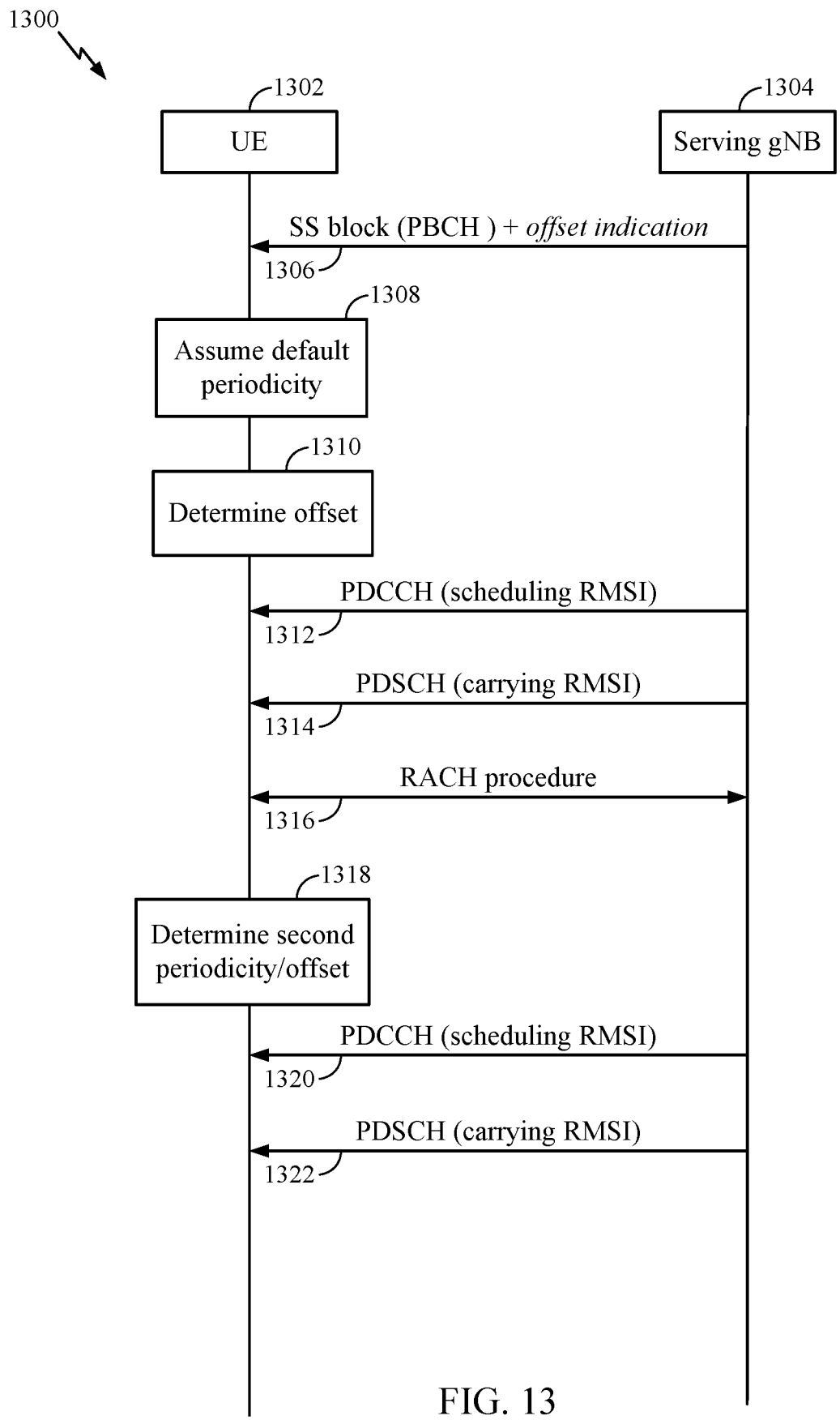
FIG. 13 is a call flow for RMSI transmission/monitoring, in accordance with certain aspects of the present disclosure.

FIG. 13 is a call flow 1300 for RMSI transmission/monitoring, in accordance with certain aspects of the present disclosure. As shown in FIG. 13, during initial access the UE 1302 may decode PBCH in the SS block, at 1308 to obtain minimum system information (e.g., MIB). Optionally, the PBCH received at 1306 may include a time offset indication of the PDCCH scheduling RMSI in the RMSI coreset/PDCCH monitoring windows. In this case, at 1310, the UE 1302 can determine offset to monitor for the PDCCH(s) based on the indication. At 1308, the UE 1302 assumes the default periodicity for the RMSI corset monitoring window. Based on the assumed periodicity and the determined offset (if received), at 1312, the UE 1302 monitors for the PDCCH scheduling RMSI from the serving gNB 1304. Based on the scheduling information in the received PDCCH, at 1314, the UE 1302 may monitor for the PDSCH carrying RMSI (e.g., SIB1) from the serving gNB 1304. At 1316, the UE may perform a RACH procedure with the serving gNB 1304 (e.g., using the minimum system information).

After performing the RACH procedure at 1316, the UE may access the cell and may be in an RRC idle or RRC connected state. At 1318, during the RRC idle or RRC connected state, the UE 1302 determines a second periodicity (and optionally the offset) to monitor for subsequent PDCCG scheduling RMSI. In some examples, the RMSI received at 1314 indicates the second periodicity (e.g., the SSB periodicity). In some examples, the UE 1302 uses the default periodicity, at 1318, that was used during initial access. At 1320, the UE 1002 may monitor at the determined periodicity and offset for the PDCCH(s) scheduling RMSI from the serving gNB 1304. Based on the scheduling information in the received PDCCH, at 1322, the UE 1302 may monitor for the PDSCH carrying RMSI from the serving gNB 1304.

Figure 14:
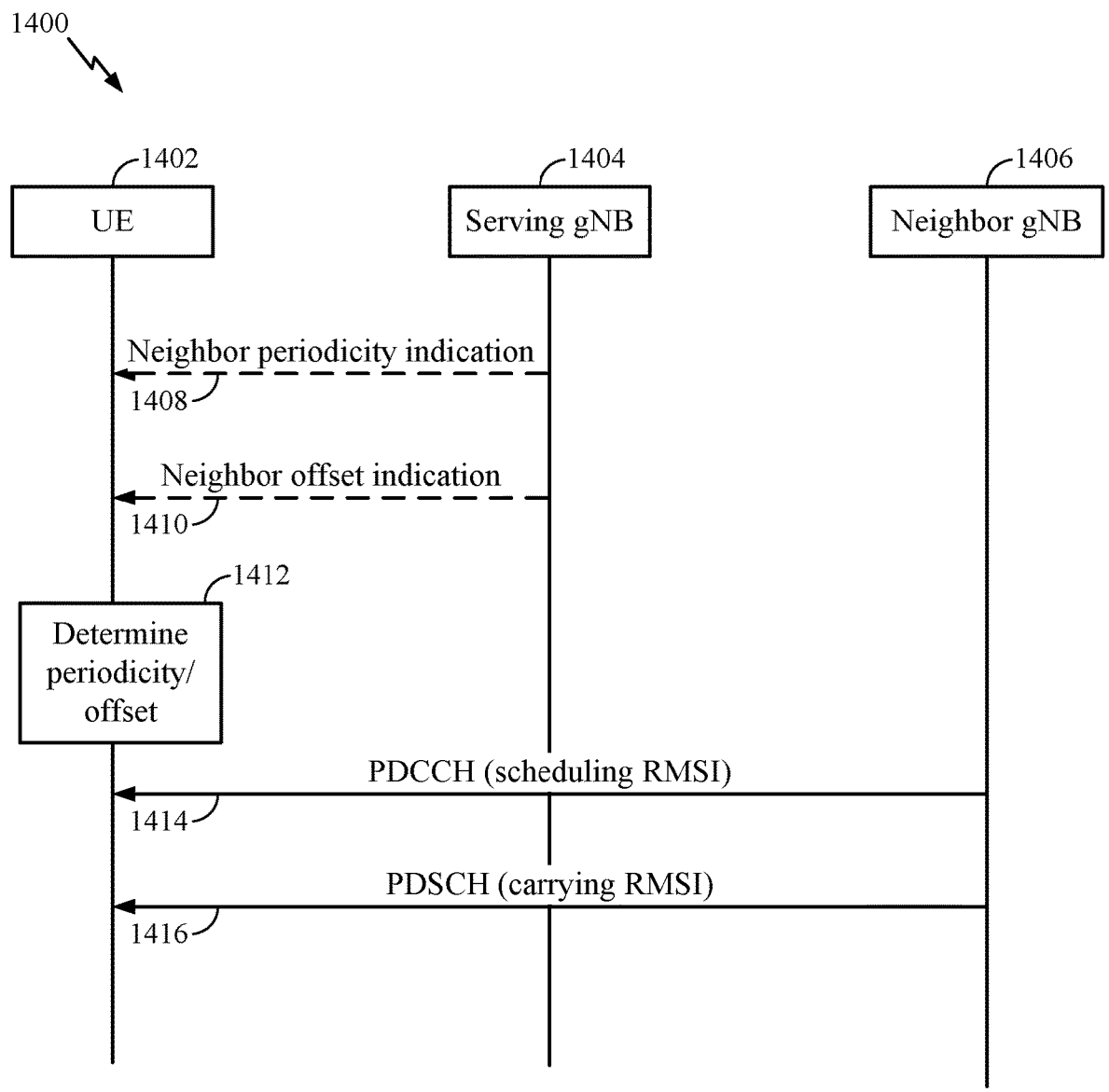
FIG. 14 is a call flow for RMSI transmission/monitoring for a neighboring cell, in accordance with certain aspects of the present disclosure.

FIG. 14 is a call flow 1400 for RMSI transmission/monitoring for a neighboring cell 1406, in accordance with certain aspects of the present disclosure. The steps of the flow chart 1400 may be performed in addition, or occur in between, the steps of the call flow 1430. As shown in FIG. 14, optionally, at 1408 the UE 1502 may receive, from the serving gNB 1404, the indication of the RMSI coreset window periodicity of the neighbor gNB 1406. Optionally, at 1410 the UE 1402 may receive the time offset of the PDCCH(s) in the neighbor cell RMSI coreset window(s). In aspects, the time offset may be received along with the periodicity indication at 1408. Thus, at 1412, the UE 1402 may determine the periodicity and/or time offset to monitor for the RMSI coreset/PDCCH monitoring window of the neighbor gNB 1406 based on the indication. If the indication is not received at 1408, then at 1412 the UE 1402 may assume the default periodicity. At 1414, the UE 1402 may monitor at the determined periodicity and/or time offset for the PDCCH scheduling RMSI from the neighbor gNB 1406. Based on the scheduling information in the received PDCCH, at 1416, the UE 1402 may monitor for the PDSCH carrying RMSI from the neighbor gNB 1406.

Although not shown in the call flows 1300 and 1400, in aspects, the UE may also receive an indication of the duration of the RMSI coreset/PDCCH monitoring windows of the serving cell and/or one or more neighboring cells.

Aspects of the present disclosure may allow the UE to determine/assume a periodicity at which to monitor for PDCCH scheduling RMSI even when the periodicity is flexible. In some aspects, the UE is able to determine the periodicity without any indication of the periodicity in the PBCH, which may have few available bits. Thus, those bits in the PBCH can be used for signaling other information. Additional aspects allow the UE to determine periodicity for neighbor cells, for use in handover and/or cell reselection. Aspects also allow the UE to determine a time offset within the RMSI coreset/PDCCH monitoring windows to monitor for the PDCCH.

Figure 15:
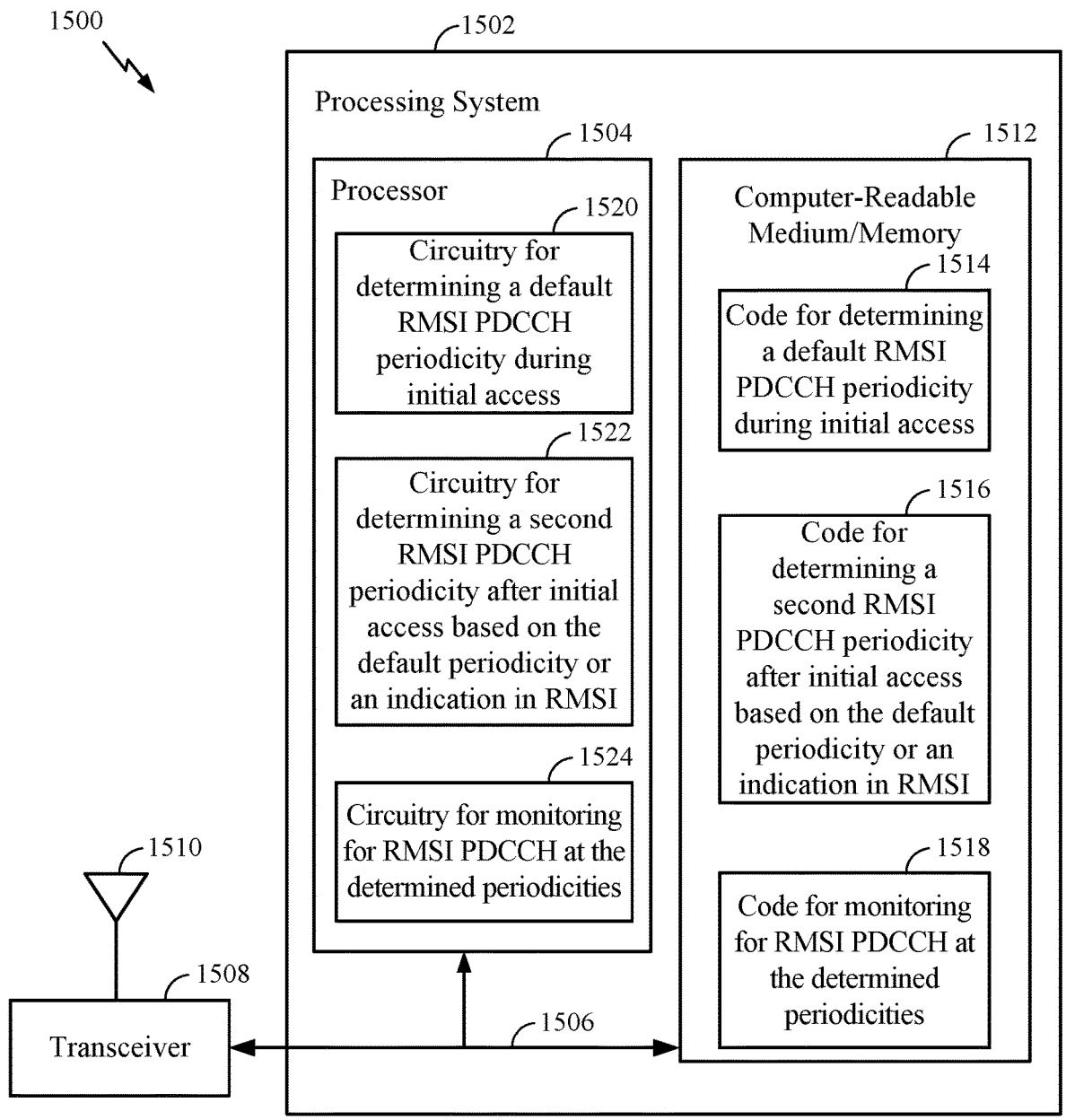
FIG. 15 illustrates an example communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 10. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 10, or other operations for performing the various techniques discussed herein for RMSI PDCCH monitoring. In certain aspects, computer-readable medium/memory 1512 stores code 1514 for determining a default RMSI PDDCH periodicity during initial access; code 1516 for determining a second RMSI PDCCH periodicity after initial based on the default periodicity or an indication in a received RMSI; and code 1518 for monitoring based on the determined periodicities. In certain aspects, the processor 1504 has circuitry configured to implement the code stored in the computer-readable medium/memory 1512. The processor 1504 includes circuitry 1520 for determining a default RMSI PDDCH periodicity during initial access; circuitry 1522 for determining a second RMSI PDCCH periodicity after initial based on the default periodicity or an indication in a received RMSI; and circuitry 1524 for monitoring based on the determined periodicities.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   during initial access of a cell, determining a preconfigured default first periodicity of a physical downlink control channel (PDCCH) monitoring window to monitor for at least a first PDCCH scheduling remaining minimum system information (RMSI);
   after the initial access, determining a second periodicity of the PDCCH monitoring window to monitor at least a second PDCCH scheduling RMSI based on the preconfigured default first periodicity or based on an indication received in RMSI from the cell;
   determining a first time offset within the PDCCH monitoring window to monitor for the first PDCCH and a second time offset within the PDCCH monitoring window to monitor for the second PDCCH;
   monitoring in the PDCCH monitoring window for at least the first PDCCH during initial access at the preconfigured default first periodicity and the first time offset; and
   monitoring in the PDCCH monitoring window for at least the second PDCCH at the second periodicity and the second time offset after the initial access.

2. The method of claim 1, further comprising:
   receiving an indication of a duration of the PDCCH monitoring window.

3. The method of claim 1, wherein:
   the method further comprises, decoding a physical broadcast channel (PBCH) in a synchronization signal block (SSB) to obtain system information, and
   at least one of: the preconfigured default first periodicity or the second periodicity is associated with the periodicity of the SSB.

4. The method of claim 3, wherein:
   multiple SSBs are transmitted in the PDCCH monitoring window, and
   the method further comprises determining when to monitor in the PDCCH monitoring window for PDCCH scheduling RMSI associated with each of the SSBs.

5. The method of claim 1, further comprising:
monitoring a physical downlink shared channel (PDSCH) for the RMSI based on the PDCCH.

6. The method of claim 1, further comprising:
selecting the preconfigured default first periodicity from a set of default periodicities, based on a frequency band.

7. The method of claim 6, wherein selecting the preconfigured default first periodicity comprises:
selecting a first default periodicity if the frequency band is below 6 GHz; and
selecting a second default periodicity if the frequency band is equal to above 6 GHz.

8. The method of claim 1, wherein determining the second periodicity comprises:
determining the second periodicity based on the indication received in a previous RMSI; or
assuming the preconfigured default first periodicity if the indication is not received.

9. The method of claim 1, wherein the determination is based on at least one of: preconfigured time offsets at the UE or signaling from the cell indicating the time offsets.

10. The method of claim 1, wherein the time offsets are the same for each PDCCH monitoring window.

11. The method of claim 1, wherein:
a first set of time offset are the same for each PDCCH monitoring window within a first modification period and a second set of time offsets are the same for each PDCCH monitoring window within a second modification period, and
the first time offsets are different than the second time offsets.

12. The method of claim 1, wherein the time offsets are for the PDCCH monitoring window of one or more neighboring cells.

13. The method of claim 1, further comprising:
receiving signaling from the cell indicating another periodicity to monitor for a PDCCH scheduling RMSI from one or more neighboring cells; or
assuming the preconfigured default first periodicity for the one or more neighboring cells if the indication is not received.

14. The method of claim 13, wherein the signaling comprises at least one of:
a single bit indicating whether the other periodicity for one of the one or more neighboring cell is the same or different as the periodicity for the cell, or
a single bit indicating whether the other periodicity for all cells within a frequency layer is the same or different as the periodicity for the cell.

15. The method of claim 13, wherein the indication is received in at least one of: RMSI, other system information (OSI), radio resource control (RRC) signaling, or a handover command from the cell.

16. The method of claim 1, wherein the preconfigured default first periodicity to monitor for the at least a first PDCCH scheduling RMSI is preconfigured prior to the initial access or predefined in wireless standards.

17. An apparatus for wireless communications, comprising:
at least one processor coupled with a memory and configured to:
determine, during initial access of a cell, a preconfigured default first periodicity of a physical downlink control channel (PDCCH) monitoring window to monitor for at least a first PDCCH scheduling remaining minimum system information (RMSI);
determine, after the initial access, a second periodicity of the PDCCH monitoring window to monitor at least a second PDCCH scheduling RMSI based on the preconfigured default first periodicity or based on an indication received in RMSI from the cell; and
determine a first time offset within the PDCCH monitoring window to monitor for the first PDCCH and a second time offset within the PDCCH monitoring window to monitor for the second PDCCH; and
a receiver configured to monitor in the PDCCH monitoring window for at least:
the first PDCCH during initial access at the preconfigured default first periodicity and the first time offset; and
the second PDCCH at the second periodicity and the second time offset after the initial access.

18. The apparatus of claim 17, wherein:
the at least one processor is further configured to decode a physical broadcast channel (PBCH) in a synchronization signal block (SSB) to obtain system information, and
at least one of: the preconfigured default first periodicity or the second periodicity is associated with the periodicity of the SSB.

19. The apparatus of claim 18, wherein:
multiple SSBs are transmitted in the PDCCH monitoring window, and
the at least one processor is configured to determine when to monitor in the PDCCH monitoring window for PDCCH scheduling RMSI associated with each of the SSBs.

20. The apparatus of claim 17, wherein the time offsets are the same for each PDCCH monitoring window.

21. An apparatus for wireless communications, comprising:
means for determining, during initial access of a cell, a preconfigured default first periodicity of a physical downlink control channel (PDCCH) monitoring window to monitor for at least a first PDCCH scheduling remaining minimum system information (RMSI);
means for determining, after the initial access, a second periodicity of the PDCCH monitoring window to monitor at least a second PDCCH scheduling RMSI based on the preconfigured default first periodicity or based on an indication received in RMSI from the cell;
means for determining a first time offset within the PDCCH monitoring window to monitor for the first PDCCH and a second time offset within the PDCCH monitoring window to monitor for the second PDCCH;
means for monitoring in the PDCCH monitoring window for at least the first PDCCH during initial access at the preconfigured default periodicity and the first time offset; and
means for monitoring in the PDCCH monitoring window for at least the second PDCCH at the second periodicity and the second time offset after the initial access.

22. The apparatus of claim 21, wherein:
the apparatus further comprises means for decoding a physical broadcast channel (PBCH) in a synchronization signal block (SSB) to obtain system information, and
at least one of: the preconfigured default first periodicity or the second periodicity is associated with the periodicity of the SSB.

23. The apparatus of claim 22, wherein:
multiple SSBs are transmitted in the CORESET PDCCH monitoring window, and the apparatus further comprises means for determining when to monitor in the PDCCH monitoring window for PDCCH scheduling RMSI associated with each of the SSBs.

24. The apparatus of claim 21, wherein the time offsets are the same for each PDCCH monitoring window.

25. A non-transitory computer readable medium having instructions stored thereon that when executed by a processor cause a user equipment (UE) to:
- determine, during initial access of a cell, a preconfigured default first periodicity of a physical downlink control channel (PDCCH) monitoring window to monitor for at least a first physical downlink control channel (PDCCH) scheduling remaining minimum system information (RMSI);
- determine, after the initial access, a second periodicity of the PDCCH monitoring window to monitor at least a second PDCCH scheduling RMSI based on the preconfigured default first periodicity or based on an indication received in RMSI from the cell;
- determine a first time offset within the PDCCH monitoring window to monitor for the first PDCCH and a second time offset within the PDCCH monitoring window to monitor for the second PDCCH;
- monitor in the PDCCH monitoring window for at least the first PDCCH during initial access at the preconfigured default first periodicity and the first time offset; and
- monitor in the PDCCH monitoring window for at least the second PDCCH at the second periodicity and the second time offset after the initial access.

\* \* \* \* \*